United States Patent [19]

Ito

[11] Patent Number: 5,881,181

[45] Date of Patent: *Mar. 9, 1999

[54] METHOD AND APPARATUS FOR COMPRESSING THE DYNAMIC RANGE OF AN IMAGE

[75] Inventor: Wataru Ito, Kanagawa-ken, Japan

[73] Assignee: Fuji Photo Film Co., Ltd., Kanagawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 686,723

[22] Filed: Jul. 26, 1996

[30] Foreign Application Priority Data

Jul. 27, 1995 [JP] Japan .................................... 7-191520

[51] Int. Cl.$^6$ ........................................................ G06T 5/00
[52] U.S. Cl. ............................................ 382/274; 382/302
[58] Field of Search ...................................... 382/340, 302, 382/132, 128, 264, 274; 250/584, 586; 378/98.4, 207, 62; 348/392, 424; 345/428, 132; 128/922

[56] References Cited

U.S. PATENT DOCUMENTS

| | | | |
|---|---|---|---|
| 5,333,065 | 7/1994 | Vuylstebe | 358/456 |
| 5,454,044 | 9/1995 | Nakajima | 382/132 |
| 5,461,655 | 10/1995 | Vuylsteke et al. | 378/62 |
| 5,467,404 | 11/1995 | Vuylstebe et al. | 382/128 |
| 5,608,813 | 3/1997 | Nakajima | 382/132 |
| 5,644,662 | 7/1997 | Vuylsteke | 382/302 |

FOREIGN PATENT DOCUMENTS

| | | |
|---|---|---|
| 527525A2 | 2/1993 | European Pat. Off. |
| 610603A1 | 8/1994 | European Pat. Off. |

OTHER PUBLICATIONS

Vuylsteke et al., Multiscale Image Contrast Amplification (MUSICA), SPIE vol. 2167 Image Processing, 1994, pp. 551–560, 1994.

Peter J. Burt, Fast Filter Transforms for Image Processing, Computer Graphics and Image Processing, vol. 16, pp. 20–51, 1981.

Laine et al., "Mammograpic Feature Enhancement by Multiscale Analysis", *IEEE Transactions on Medical Imaging*, vol. 13, No. 4, Dec. 1994, pp. 725–740.

Laine et al., "Contrast Enhancement by Dyadic Wavelet Analysis", Proceedings of the 16th Annual International Conference of the IEEE, vol. 1, pp. A10–A11, 1994.

Burt et al., "The Laplacian Pyramid as a Compact Image Code", *IEEE Transactions on Communications*, vol. com–31, No. 4, Apr. 1983, pp. 532–540.

*Primary Examiner*—Leo H. Boudreau
*Assistant Examiner*—Brian P. Werner
*Attorney, Agent, or Firm*—Sughrue, Mion, Zinn, Macpeak & Seas, PLLC

[57] ABSTRACT

An original image is transformed into a multi-resolution space and is thereby decomposed into images, each of which is of one of a plurality of different frequency bands. An image of the lowest frequency band, which is lowest among the plurality of the different frequency bands, is processed with the formula $$g_L' = g_L + f_1(g_L) = f_2(g_L)$$

wherein $f_1(g_L)$ represents a function, the value of which decreases monotonically as the signal value $g_L$ of the image of the lowest frequency band increases. A processed image of the lowest frequency band is obtained from the processing. An inverse multi-resolution transform is then carried out on the processed image of the lowest frequency band and the images of the other frequency bands, and a processed image is thereby obtained.

12 Claims, 7 Drawing Sheets

FIG.3

| 0.0025 | 0.0125 | 0.02 | 0.0125 | 0.0025 |
|--------|--------|------|--------|--------|
| 0.0125 | 0.0625 | 0.1  | 0.0625 | 0.0125 |
| 0.02   | 0.1    | 0.16 | 0.1    | 0.02   |
| 0.0125 | 0.0625 | 0.1  | 0.0625 | 0.0125 |
| 0.0025 | 0.0125 | 0.02 | 0.0125 | 0.0025 |

FIG.4
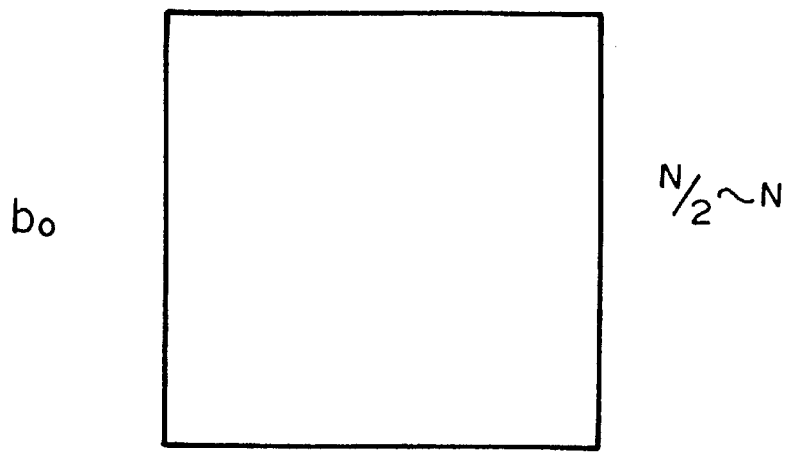
$b_0$      $N/2 \sim N$
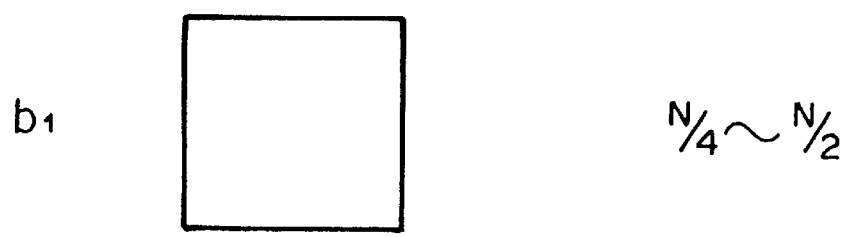
$b_1$      $N/4 \sim N/2$
$b_2$      $N/8 \sim N/4$
⋮
$b_{L-1}$      $N/2^L \sim N/2^{L-1}$
$g_L$      $0 \sim N/2^L$

METHOD AND APPARATUS FOR COMPRESSING THE DYNAMIC RANGE OF AN IMAGE

BACKGROUND OF THE INVENTION

1. Field of the Invention

This invention relates to an image processing method and apparatus for carrying out image processing on an image of a predetermined frequency band in an original image.

2. Description of the Prior Art

Techniques for obtaining an image signal, which represents an image, carrying out appropriate image processing on the image signal, and then reproducing a visible image by use of the processed image signal have heretofore been known in various fields. For example, in Japanese Unexamined Patent Publication No. 55(1980)-163772, the applicant proposed a method for carrying out frequency emphasis processing, such as unsharp mask processing, on an image signal, such that a visible radiation image may be obtained, which has good image quality and can serve as an effective tool in, particularly, the efficient and accurate diagnosis of an illness. With the frequency processing, an unsharp mask signal is subtracted from an image signal representing an original image, the resulting difference value is multiplied by an emphasis coefficient, and the thus obtained product is added to the image signal. In this manner, predetermined frequency components in the image are emphasized.

A different method for carrying out frequency processing on an image signal has also been proposed. With the proposed frequency processing method, an image is transformed into multi-resolution images by a Fourier transform, a wavelet transform, a sub-band transform, or the like, and the image signal representing the image is thereby decomposed into signals falling within a plurality of different resolutions or frequency bands. Thereafter, of the decomposed signals, a signal falling within a desired frequency band is subjected to predetermined image processing, such as emphasis.

Further, recently in the field of image processing, a novel technique for transforming an image into a multi-resolution space, which is referred to as the Laplacian pyramid technique, has been proposed in, for example, Japanese Unexamined Patent Publication No. 6(1994)-301766. With the proposed Laplacian pyramid technique, mask processing is carried out on the original image by using a mask having characteristics such that it may be approximately represented by a Gaussian function. A sub-sampling operation is then carried out on the resulting image in order to thin out the number of the picture elements to one half along each of two-dimensional directions of the array of the picture elements in the image, and an unsharp image having a size of one-fourth of the size of the original image is thereby obtained. Thereafter, a picture element having a value of 0 is inserted into each of the points on the unsharp image, which were eliminated during the sampling operation, and the image size is thereby restored to the original size. Mask processing is then carried out on the thus obtained image by using the aforesaid mask, and an unsharp image is thereby obtained. The thus obtained unsharp image is subtracted from the original image, and a detail image of a predetermined frequency band of the original image is thereby obtained. This processing is iterated with respect to the obtained unsharp image, and n number of unsharp images having sizes of $\frac{1}{2}^{2n}$ of the size of the original image are thereby formed. As described above, the sampling operation is carried out on the image, which has been obtained from the mask processing with the mask having characteristics such that it may be approximately represented by the Gaussian function. Therefore, though the Gaussian filter is actually used, the same processed image as that obtained when a Laplacian filter is used is obtained. Also, in this manner, the images of low frequency bands, which have the sizes of $\frac{1}{2}_{2N}$ of the size of the original image are successively obtained from the image of the original image size. Therefore, the group of the images obtained as a result of the processing is referred to as the Laplacian pyramid.

The Laplacian pyramid technique is described in detail in, for example, "Fast Filter Transforms for Image Processing" by Burt P. J., Computer Graphics and Image Processing, Vol. 16, pp. 20–51, 1981; "Fast Computation of the Difference of Low•Pass Transform" by Growley J. L., Stern R. M., IEEE Trans. on Pattern Analysis and Machine Intelligence, Vol. 6, No. 2, March 1984; "A Theory for Multiresolution Signal Decomposition; The Wavelet Representation" by Mallat S. G., IEEE Trans. on Pattern Analysis and Machine Intelligence, Vol. 11, No. 7, July 1989; "Image Compression by Gabor Expansion" by Ebrahimi T., Kunt M., Optical Engineering, Vol. 30, No. 7, pp. 873–880, July 1991; and "Multiscale Image Contrast Amplification" by Pieter Vuylsteke, Emile Schoeters, SPIE, Vol. 2167, Image Processing (1994), pp. 551–560.

Japanese Unexamined Patent Publication No. 6(1994)-301766 mentioned above discloses a method, wherein processing for emphasizing image values is carried out on the images of all of the frequency bands in the Laplacian pyramid, which images have been obtained in the manner described above, and the image of each frequency band, which has been obtained from the emphasis processing, is then subjected to an inverse transform, and a processed image is thereby obtained. In the image obtained from such processing, the image has been emphasized in each frequency band. Therefore, an image is obtained such that unsharp mask processing might have been carried out substantially with masks having a plurality of sizes in the aforesaid unsharp mask processing.

Also, "Multiscale Image Contrast Amplification" mentioned above discloses a method comprising the steps of: (i) carrying out processing for multiplying the density of the lowest resolution image, which has the lowest resolution among the images having been decomposed with the Laplacian pyramid technique into a plurality of different frequency bands, by a factor of a (a<1), and (ii) carrying out an inverse multi-resolution transform on the lowest resolution image, which has been obtained from the processing, and the images of the other frequency bands, a processed image being thereby obtained. With the disclosed method, the contrast of the lowest resolution image is restricted, and the processed image can be obtained such that portions of the image covering a wide range of image density can be used. Therefore, it is possible to obtain substantially the same processed image as that obtained when a dynamic range compressing process is carried out on the original image.

However, with the method disclosed in "Multiscale Image Contrast Amplification" mentioned above, the image of the lowest frequency band is merely multiplied by a factor of a, and therefore all of the signal values of the image of the lowest frequency band are processed equally. Therefore, the image information of a signal range, which it is not necessary to process, in the image of the lowest frequency band is processed together with the image information which is to be processed. Accordingly, the degree of freedom of image processing cannot be kept high, and a processed image having a desired quality cannot be obtained. For example, in cases where processing is carried out on a radiation image of the chest of a human body, if the processing described in "Multiscale Image Contrast Amplification" mentioned above is carried out on the image of the lowest frequency band such that the change in density in the mediastinum region may become perceptible, the mediastinum region will become perceptible, but the lung field regions having a high density will be affected adversely. As a result, the thus obtained image will become imperceptible as a whole.

SUMMARY OF THE INVENTION

The primary object of the present invention is to provide an image processing method, wherein the degree of freedom of image processing is kept high, and a processed image, which is perceptible, is obtained.

Another object of the present invention is to provide an apparatus for carrying out the image processing method.

The present invention provides a first image processing method, comprising the steps of:

i) transforming an original image into a multi-resolution space, the original image being thereby decomposed into images, each of which is of one of a plurality of different frequency bands, ii) processing an image of the lowest frequency band, which is lowest among the plurality of the different frequency bands, with the formula $$g_L' = g_L + f_1(g_L) = f_2(g_L)$$

wherein $f_1(g_L)$ represents a function, the value of which decreases monotonically as the signal value $g_L$ of the image of the lowest frequency band increases, a processed image of the lowest frequency band being obtained from the processing, and iii) carrying out an inverse multi-resolution transform of the processed image of the lowest frequency band and the images of the other frequency bands, a processed image being obtained from the inverse multi-resolution transform.

The present invention also provides a second image processing method, comprising the steps of:

i) transforming an original image into a multi-resolution space, the original image being thereby decomposed into images, each of which is of one of a plurality of different frequency bands, ii) processing an image of the lowest frequency band, which is lowest among the plurality of the different frequency bands, with the formula $$g_L' = g_L + \alpha \cdot f_3(g_L)$$

wherein $f_3(g_L)$ represents a function, the value of which decreases monotonically as the signal value $g_L$ of the image of the lowest frequency band increases, and $\alpha$ represents the degree of emphasis, a processed image of the lowest frequency band being obtained from the processing, and iii) carrying out an inverse multi-resolution transform of the processed image of the lowest frequency band and the images of the other frequency bands, a processed image being obtained from the inverse multi-resolution transform.

The present invention further provides a first image processing apparatus, comprising:

i) a multi-resolution decomposing means for transforming an original image into a multi-resolution space, the original image being thereby decomposed into images, each of which is of one of a plurality of different frequency bands, ii) an operation means for processing an image of the lowest frequency band, which is lowest among the plurality of the different frequency bands, with the formula $$g_L' = g_L + f_1(g_L) = f_2(g_L)$$

wherein $f_1(g_L)$ represents a function, the value of which decreases monotonically as the signal value $g_L$ of the image of the lowest frequency band increases, a processed image of the lowest frequency band being obtained from the processing, and iii) an inverse transform means for carrying out an inverse multi-resolution transform of the processed image of the lowest frequency band and the images of the other frequency bands, a processed image being obtained from the inverse multi-resolution transform.

The present invention still further provides a second image processing apparatus, comprising the steps of:

i) a multi-resolution decomposing means for transforming an original image into a multi-resolution space, the original image being thereby decomposed into images, each of which is of one of a plurality of different frequency bands, ii) an operation means for processing an image of the lowest frequency band, which is lowest among the plurality of the different frequency bands, with the formula $$g_L' = g_L + \alpha \cdot f_3(g_L)$$

wherein $f_3(g_L)$ represents a function, the value of which decreases monotonically as the signal value $g_L$ of the image of the lowest frequency band increases, and $\alpha$ represents the degree of emphasis, a processed image of the lowest frequency band being obtained from the processing, and iii) an inverse transform means for carrying out an inverse multi-resolution transform of the processed image of the lowest frequency band and the images of the other frequency bands, a processed image being obtained from the inverse multi-resolution transform.

The term "transforming an original image into a multi-resolution space" as used herein means decomposing the image signal, which represents the original image, into image signals representing the images of a plurality of different frequency bands by using a predetermined filter for the Laplacian pyramid technique, the wavelet transform, the sub-band transform, or the like.

With the first image processing method and apparatus in accordance with the present invention, the image of the lowest frequency band, which is among the images of the plurality of the different frequency bands having been obtained from the transform into the multi-resolution space, is processed with the formula $$g_L' = g_L + f_1(g_L) = f_2(g_L)$$

wherein $f_1(g_L)$ represents the function, the value of which decreases monotonically as the signal value $g_L$ of the image of the lowest frequency band increases. The processed image of the lowest frequency band is obtained from the processing. Therefore, the dynamic range of the entire image of the lowest frequency band can be compressed, and the contrast of an image portion, at which the signal values are comparatively large, can be kept high. Accordingly, the processed image of the lowest frequency band can be obtained such that the portions of the image covering a wide range of image density can be used and may have good image quality. The inverse multi-resolution transform is then carried out on the processed image of the lowest frequency band and the images of the other frequency bands. From the inverse multi-resolution transform, a processed image can be obtained, in which the dynamic range compressing process has been carried out in accordance with different regions of the image.

With the second image processing method and apparatus in accordance with the present invention, the image of the lowest frequency band is processed with the formula $g_L' = g_L + \alpha \cdot f_3(g_L)$ wherein $f_3(g_L)$ represents the function, the value of which decreases monotonically as the signal value $g_L$ of the image of the lowest frequency band increases, and α represents the degree of emphasis. The processed image of the lowest frequency band is obtained from the processing. Therefore, the extent of the dynamic range compressing process carried out on the image of the lowest frequency band can be altered. Accordingly, the dynamic range compressing process can be carried out with a high degree of freedom.

BRIEF DESCRIPTION OF THE DRAWINGS

FIG. 3 is an explanatory view showing a low pass filter, FIG. 4 is an explanatory view showing detail images of a plurality of different frequency bands, which are obtained with a Laplacian pyramid technique.

DESCRIPTION OF THE PREFERRED EMBODIMENTS

The present invention will hereinbelow be described in further detail with reference to the accompanying drawings.

Figure 1:
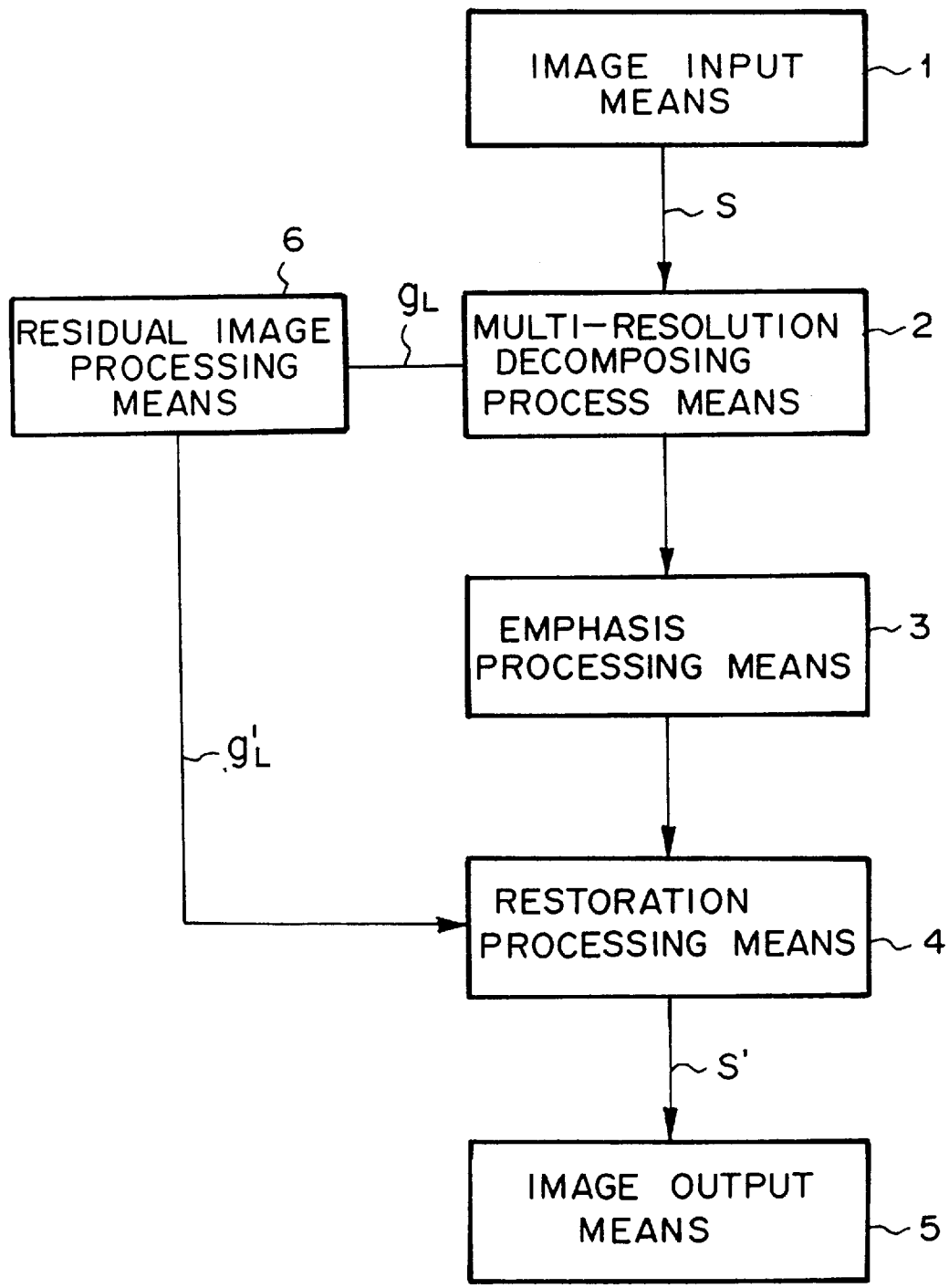
FIG. 1 is a block diagram showing an apparatus for carrying out an embodiment of the image processing method in accordance with the present invention.

FIG. 1 is a block diagram showing an apparatus for carrying out an embodiment of the image processing method in accordance with the present invention. As illustrated in FIG. 1, the apparatus for carrying out the embodiment of the image processing method in accordance with the present invention comprises an image input means 1 for feeding an image signal, which represents an original image, into the apparatus, and a multi-resolution decomposing process means 2 for carrying out a multi-resolution decomposing process on the original image and thereby obtaining decomposed images of a plurality of different frequency bands or resolutions. The apparatus also comprises an emphasis processing means 3 for carrying out emphasis processing, which will be described later, on an image of a predetermined frequency band, which is among the decomposed images of the plurality of the different frequency bands having been obtained from the multi-resolution decomposing process means 2. The apparatus further comprises a restoration processing means 4 for restoring the image of the predetermined frequency band, which has been obtained from the emphasis processing carried out by the emphasis processing means 3, and the images of the other frequency bands into a processed image. The apparatus still further comprises an image output means 5 for reproducing the processed image, which has been restored by the restoration processing means 4, as a visible image. The apparatus also comprises a residual image processing means 6 for carrying out a dynamic range compressing process, which will be described later, on a residual image, which is the image of the lowest frequency band obtained from the multi-resolution decomposing process means 2.

Figure 2:
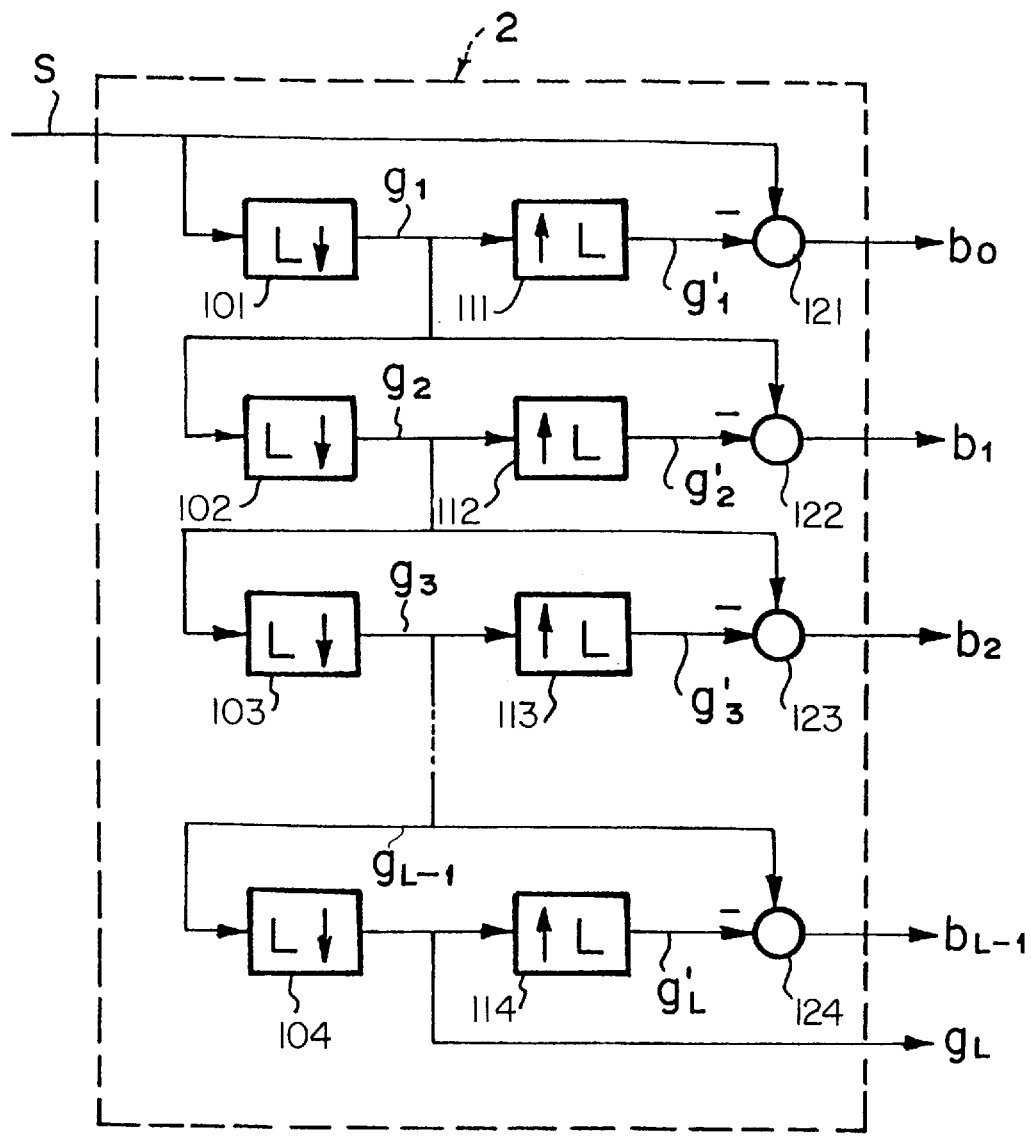
FIG. 2 is a block diagram showing a multi-resolution decomposing process means.

How the embodiment of the image processing method in accordance with the present invention operates will be described hereinbelow. FIG. 2 is a block diagram showing how the processing is carried out by the multi-resolution decomposing process means 2 shown in FIG. 1. In this embodiment, by way of example, the Laplacian pyramid technique is utilized in order to decompose an image signal S, which represents the original image, into multi-resolution images. As illustrated in FIG. 2, the digital image signal S, which represents the original image, is fed into a first filtering means 101 of the multi-resolution decomposing process means 2. In the multi-resolution decomposing process means 2, the digital image signal S is fed into a first filtering means 101, which carries out a filtering process on the digital image signal S by using a low pass filter. By way of example, as illustrated in FIG. 3, the low pass filter approximately corresponds to a two-dimensional Gaussian distribution on a 5×5 grid. As will be described later, the same types of low pass filters as that shown in FIG. 3 are utilized for all of the multi-resolution images.

Also, in the filtering means 101, the image signal S, which has been obtained from the filtering process carried out with the low pass filter, is subjected to a sampling process. The filtering means 101 samples the signal components of the image signa S at every second row and every second column in the array of picture elements of the original image. An image signal representing a low-resolution approximate image $g_1$ is thus obtained from the filtering means 101. The low-resolution approximate image $g_1$ has a size of one-fourth of the size of the original image. Thereafter, in a first interpolating operation means 111, a single picture element having a value of 0 is inserted into each of the points on the low-resolution approximate image $g_1$, which were eliminated during the sampling process. Specifically, a single picture element having a value of 0 is inserted between every set of two adjacent picture elements located along each row and each column in the array of picture elements of the low-resolution approximate image $g_1$. The low-resolution approximate image $g_1$, into which the picture elements having a value of 0 have thus been inserted at intervals of a single picture element, is unsharp, and the change in the signal value of the low-resolution approximate image $g_1$ is not smooth due to the picture elements having a value of 0, which have been inserted at intervals of a single picture element.

Further, in the first interpolating operation means 111, the low-resolution approximate image $g_1$, into which the picture elements having a value of 0 have been inserted in the manner described above, is subjected to a filtering process with the low pass filter shown in FIG. 3. An image signal representing a low-resolution approximate image $g_1'$ is thus obtained from the first interpolating operation means 111. The change in the signal value of the image signal representing a low-resolution approximate image $g_1'$ is smoother than the change in the signal value of the aforesaid low-resolution approximate image $g_1$, into which the picture elements having a value of 0 have been inserted. Also, the low-resolution approximate image $g_1'$ has the characteristics such that the image information of the frequency band higher than the middle frequency in the frequency band of the original image have been eliminated from the original image. This is because, as described above, the size of the low-resolution approximate image $g_1$ has been reduced to one-fourth of the size of the original image, the picture elements having a value of 0 have been inserted at intervals of a single picture element into the low-resolution approximate image $g_1$, and the filtering process has then been carried out on the low-resolution approximate image $g_1$ by using the low pass filter shown in FIG. 3. As a result, the image is obtained such that the image information of the frequency band higher than the middle frequency in the frequency band of the original image might have been blurred with the Gaussian function.

Thereafter, in a first subtracter 121, the image signal representing the low-resolution approximate image $g_1'$ is subtracted from the image signal S representing the original image, and an image signal representing a detail image $b_0$ is thereby obtained. Specifically, the image signal components of the image signal representing the low-resolution approximate image $g_1'$ and the image signal S representing the original image, which image signal components represent corresponding picture elements in the two images, are subtracted from each other. As described above, the low-resolution approximate image $g_1'$ has the characteristics such that the image information of the frequency band higher than the middle frequency in the frequency band of the original image might have been blurred. Therefore, the detail image $b_0$ represents only the image information of the frequency band higher than the middle frequency in the frequency band of the original image. Specifically, as illustrated in FIG. 4, the detail image $b_0$ represents the image information of the frequency band of N/2 to N, where N represents the Nyquist frequency of the original image.

Thereafter, the image signal representing the low-resolution approximate image $g_1$ is fed into a second filtering means 102 and subjected to the filtering process using the low pass filter shown in FIG. 3. Also, in the filtering means 102, the image signal representing the low-resolution approximate image $g_1$, which has been obtained from the filtering process, is subjected to a sampling process. The filtering means 102 samples the signal components of the image signal, which represents the low-resolution approximate image $g_1$, at every second row and every second column in the array of picture elements of the low-resolution approximate image $g_1$. An image signal representing a low-resolution approximate image $g_2$ is thus obtained from the filtering means 102. The low-resolution approximate image $g_2$ has a size of one-fourth of the size of the low-resolution approximate image $g_1$, i.e. a size of one-sixteenth of the size of the original image. Thereafter, in a second interpolating operation means 112, a single picture element having a value of 0 is inserted into each of the points on the low-resolution approximate image $g_2$, which were eliminated during the sampling process. Specifically, a single picture element having a value of 0 is inserted between every set of two adjacent picture elements located along each row and each column in the array of picture elements of the low-resolution approximate image $g_2$. The low-resolution approximate image $g_2$, into which the picture elements having a value of 0 have thus been inserted at intervals of a single picture element, is unsharp, and the change in the signal value of the low-resolution approximate image $g_2$ is not smooth due to the picture elements having a value of 0, which have been inserted at intervals of a single picture element.

Further, in the second interpolating operation means 112, the low-resolution approximate image $g_2$, into which the picture elements having a value of 0 have been inserted in the manner described above, is subjected to a filtering process with the low pass filter shown in FIG. 3. An image signal representing a low-resolution approximate image $g_2'$ is thus obtained from the first interpolating operation means 112. The change in the signal value of the image signal representing a low-resolution approximate image $g_2'$ is smoother than the change in the signal value of the aforesaid low-resolution approximate image $g_2$, into which the picture elements having a value of 0 have been inserted. Also, the low-resolution approximate image $g_2'$ has the characteristics such that the image information of the frequency components higher than the middle frequency in the frequency band of the low-resolution approximate image $g_1$ has been eliminated from the low-resolution approximate image $g_1$.

Thereafter, in a second subtracter 122, the image signal representing the low-resolution approximate image $g_2'$ is subtracted from the image signal representing the low-resolution approximate image $g_1$, and an image signal representing a detail image $b_1$ is thereby obtained. Specifically, the image signal components of the image signal representing the low-resolution approximate image $g_2'$ and the image signal representing the low-resolution approximate image $g_1$, which image signal components represent corresponding picture elements in the two images, are subtracted from each other. As described above, the low-resolution approximate image $g_2'$ has the characteristics such that the image information of the frequency band higher than the middle frequency in the frequency band of the low-resolution approximate image $g_1$ might have been blurred. Therefore, the detail image $b_1$ represents only the image information of the frequency band higher than the middle frequency in the frequency band of the low-resolution approximate image $g_1$. Specifically, as illustrated in FIG. 4, the detail image $b_1$ represents only the image information of the frequency band higher than the middle frequency in the frequency band of the low-resolution approximate image $g_1$, i.e. the image information of the frequency band of N/4 to N/2, where N represents the Nyquist frequency of the original image. In this manner, the detail image is obtained by carrying out the filtering process with the low pass filter having the Gaussian distribution. However, since the image having been obtained from the filtering process is subtracted from the low-resolution approximate image, substantially the same results as those obtained when the filtering process is carried out with a Laplacian filter can be obtained.

The processing described above is carried out successively for low-resolution approximate images $g_k$, where k=1 to N, which have been respectively filtered and sampled with the corresponding filtering means 101–104. In this manner, as illustrated in FIG. 4, n number of detail images $b_k$, wherein k=0 to L−1, and a residual image $g_L$ of the low-resolution approximate image are obtained. The levels of the resolution of the detail images $b_k$ successively become lower, starting with the resolution of the detail image $b_0$. Specifically, the frequency bands of the detail images $b_k$ successively become lower. The detail images $b_k$ respectively represent the frequency bands of $N/2^{k+1}$ to $N/2^k$ with respect to the Nyquist frequency N of the original image, and the sizes of the detail images $b_k$ become $\frac{1}{2}^{2k}$ times as large as the size of the original image. Specifically, the size of the detail image $b_0$, which has the highest resolution, is equal to the size of the original image, and the size of the detail image $b_1$, which has a high resolution next to the resolution of the detail image $b_0$, is one-fourth of the size of the original image. The sizes of the detail images thus successively become smaller, starting with the size equal to the size of the original image. Also, the detail images are substantially identical with the images obtained from the process using the Laplacian filter. Therefore, the multi-resolution transform in this embodiment is referred to as the Laplacian pyramid. The residual image $g_L$ may be regarded as being an approximate image having a very low resolution with respect to the original image. In extreme cases, the residual image $g_L$ is constituted of only a single piece of image information, which represents the mean value of the signal values of the original image. The information representing the detail images $b_k$ and the residual image $g_L$, which have thus been obtained, is stored in a memory (not shown).

Thereafter, in the emphasis processing means 3, predetermined emphasis processing is carried out on a detail image $b_k$ of a desired frequency band, which is among the detail images $b_k$ having been obtained in the manner described above. The emphasis processing is carried out by multiplying the detail image $b_k$ of the desired frequency band by a predetermined emphasis coefficient.

Also, in the residual image processing means 6, the dynamic range compressing process is carried out on the residual image $g_L$. How the dynamic range compressing process is carried out will be described hereinbelow.

Figure 5A:
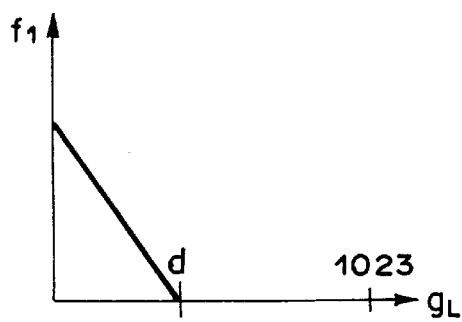
FIGS. 5A, 5B, and 5C are graphs showing examples of the characteristics of functions f.

FIG. 5A is a graph showing an example of a monotonically decreasing function, in which the value of the residual image signal $g_L$ serves as a variable. (As an aid in facilitating the explanation, the same reference character is used for both the residual image and the residual image signal.) The maximum value of the residual image signal $g_L$ is 1,023. A function $f_1(g_L)$ shown in FIG. 5A has the characteristics such that the value of the function $f_1(g_L)$ changes when the residual image signal $g_L$ takes a small value, and such that the value of the function $f_1(g_L)$ is equal to zero when the value of the residual image signal $g_L$ is larger than d. For each picture element (i,j), a calculation using the function $f_1(g_L)$ is carried out with Formula (1).

$$g_L'^{ij} = g_L^{ij} + f_1(g_L) \quad (1)$$

In this manner, an image signal representing a processed residual image $g_L'$, which image signal corresponds to all of the picture elements in the residual image, is obtained.

Figure 6:
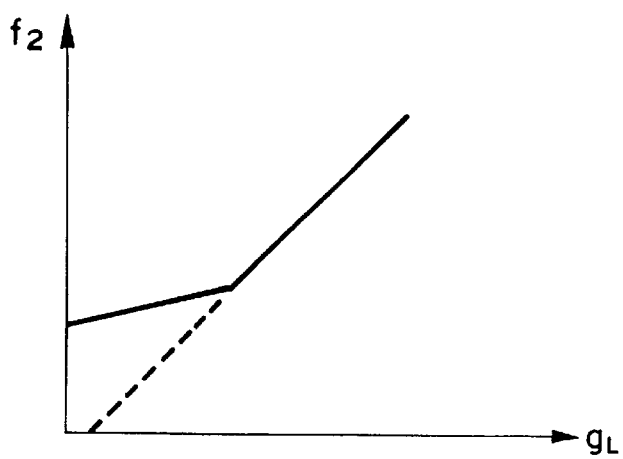
FIG. 6 is a graph showing the characteristics of a processed image signal.

FIG. 6 shows the image signal representing the processed residual image $g_L'$, which is obtained when the value of the residual image signal $g_L$ changes along a straight line with respect to the x direction on the residual image. As illustrated in FIG. 6, the dynamic range of the region in which the value of the residual image signal $g_L$ is small, i.e. the region in which the mean density is low, is compressed. Also, the contrast of a portion, at which the signal value is comparatively high, in each region is kept at the same level as that prior to the compression.

Thereafter, an inverse transform is carried out on the detail image $b_k$ of the predetermined frequency band, which image has been obtained from the emphasis processing, the detail images of the other frequency bands, and the processed residual image $g_L'$. The restoration processing means 4 carries out the inverse transform processing in the manner described below.

Figure 7:
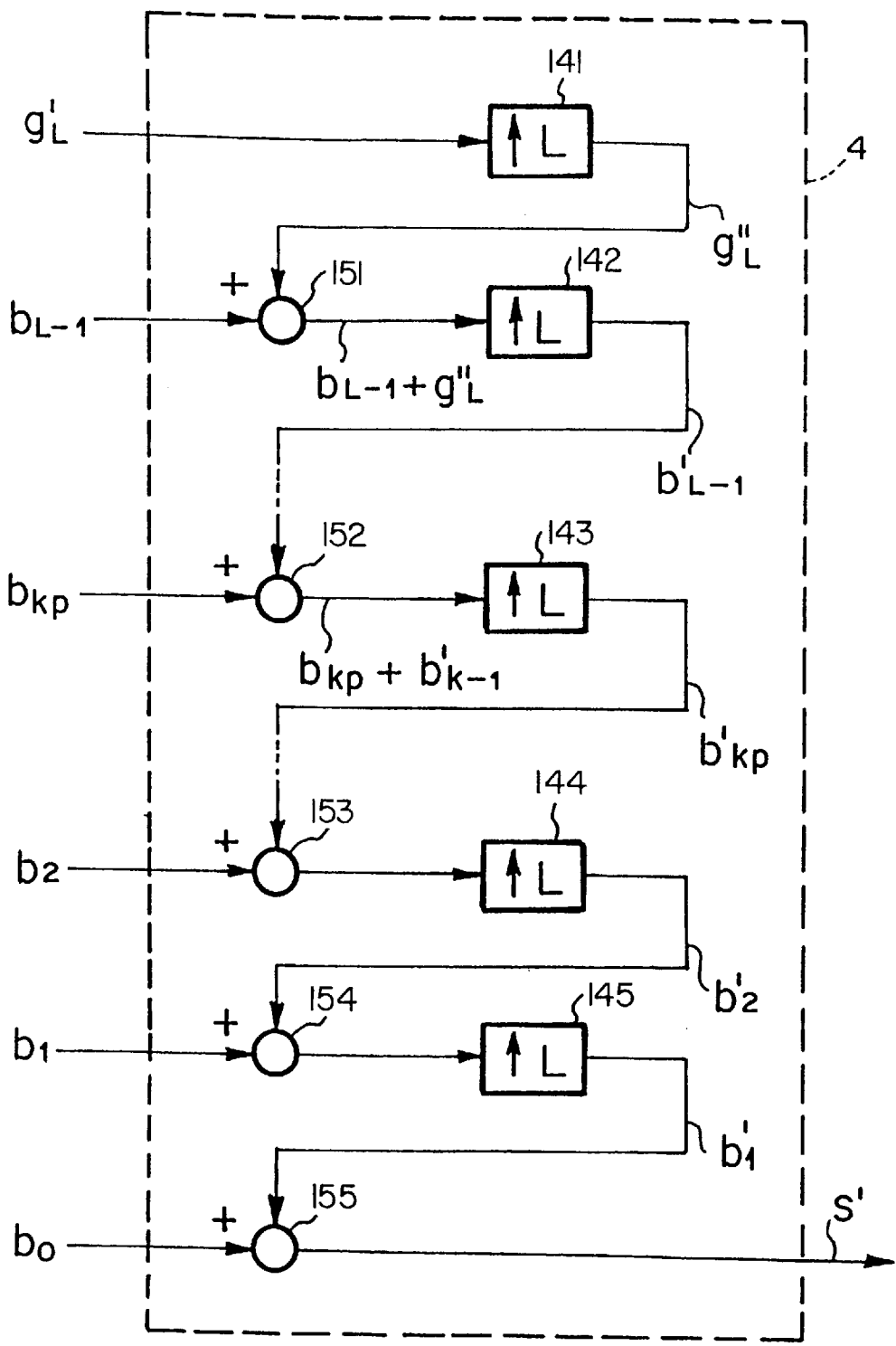
FIG. 7 is a block diagram showing a restoration processing means.

FIG. 7 shows how the inverse transform is carried out. Firstly, the image signal representing the processed residual image $g_L'$, is fed into a first interpolating operation means 141. In the first interpolating operation means 141, picture elements are inserted between adjacent picture elements of the processed residual image $g_L'$, and an image signal representing an image $g_L''$, which has a size four times as large as the size of the processed residual image $g_L'$, is thereby obtained. The image signal representing the image $g_L''$ having been obtained from the interpolating operation is then fed into a first adder 151. In the first adder 15, the image signal components of the image signal representing the image $g_L''$ and the image signal representing a lowest resolution detail image $b_{n-1}$, which image signal components represent corresponding picture elements in the two images, are added to each other. An image signal representing an addition image $(g_L''+b_{n-1})$ is thereby obtained. The image signal representing the addition image $(g_L''+b_{n-1})$ is then fed into a second interpolating operation means 142. In the second interpolating operation means 142, picture elements are inserted between adjacent picture elements of the addition image $(g_L''+b_{n-1})$, and an image signal representing an image $b_{n-1}'$, which has a size four times as large as the size of the detail image $b_{n-1}$, is thereby obtained.

Thereafter, the image signal representing the image $b_{n-1}'$ is fed into a second adder 152. In the second adder 152, the image signal components of the image signal representing the image $b_{n-1}'$ and the image signal representing a detail image $b_{n-2}$ of a resolution higher by a single level than the resolution of the detail image $b_{n-1}$, which image signal components represent corresponding picture elements in the two images, are added to each other. An image signal representing an addition image $(b_{n-1}'+b_{n-2})$ is thereby obtained. The image signal representing the addition image $(b_{n-1}'+b_{n-2})$ is then fed into a third interpolating operation means 143. In the third interpolating operation means 143, picture elements are inserted between adjacent picture elements of the addition image $(b_{n-1}'+b_{n-2})$, and an image signal representing an image $b_{n-2}'$, which has a size four times as large as the size of the detail image $b_{n-2}$, is thereby obtained.

The processing described above is iterated, and the same processing is carried out also for the emphasized image $b_{kp}$. Specifically, in an adder 153, the image signal representing the emphasized image $b_{kp}$ and the image signal representing an image $b_{k-1}'$, which is of a resolution lower by a single level than the resolution of the emphasized image $b_{kp}$ and has been obtained from the processing described above, are added to each other. An image signal representing the addition image $(b_{kp}+b_{k-1}')$ is thereby obtained. Thereafter, in an interpolating operation means 143, picture elements are inserted between adjacent picture elements of the addition image $(b_{kp}+b_{k-1}')$, and an image signal representing an interpolation image $b_{kp}'$ is thereby obtained. The processing is successively carried out for the detail images of higher frequency bands. Finally, in an adder 155, an image signal representing an interpolation image $b_1'$ and an image signal representing the detail image $b_0$ having the highest resolution are added to each other, and a processed image signal S' is thereby obtained.

The processed image signal S' having thus been obtained is fed into the image output means 5 and used in the reproduction of a visible image. The image output means 5 may be constituted of a display means, such as a cathode ray tube (CRT) display means, a recording apparatus for recording an image on photographic film by a light beam scanning operation, or a device for storing an image signal in an image file on an optical disk, a magnetic disk, or the like.

In this manner, the visible image can be reproduced from the processed image signal S' such that the contrast of fine structures in the high density region may be kept high, and such that the dynamic range of the entire image may be compressed.

In the embodiment described above, the transform of the original image into the multi-resolution images is carried out by utilizing the Laplacian pyramid technique. However, the image processing method in accordance with the present invention is not limited to the use of the Laplacian pyramid technique. For example, the transform of the original image into the multi-resolution images may be carried out by utilizing one of other techniques, such as a wavelet transform or a sub-band transform.

The wavelet transform has recently been developed as a frequency analysis method and has heretofore been applied to stereo pattern matching, signal compression, and the like. The wavelet transform is described in, for example, "Wavelets and Signal Processing," by Olivier Rioul and Martin Vetterli, IEEE SP Magazine, pp. 14–38, October 1991; and "Zero-Crossings of a Wavelet Transform," by Stephane Mallat, IEEE Transactions on Information Theory, Vol. 37, No. 4, pp. 1019–1033, July 1991.

With the wavelet transform, a signal is transformed into frequency signals, each being of one of a plurality of different frequency bands, in accordance with the formula $$W(a, b) = \int_{-\infty}^{\infty} f(t)h(a, b)dt \tag{2}$$

wherein f(t): the signal having an arbitrary wave form,
W(a,b): the wavelet transform of f(t), $$h(a, b) = \frac{1}{\sqrt{a}} h(at - b)$$

a: the degree of contraction of the function,
b: the amount of movement in the horizontal axis direction.

Specifically, the filtering process is carried out by changing the period and the degree of contraction of the function h and moving the original signal. In this manner, frequency signals adapted to desired frequencies ranging from a fine frequency to a coarse frequency can be prepared.

The sub-band transform includes the technique for obtaining the images of two frequency bands by utilizing a single kind of filter as in the wavelet transform, and the technique for obtaining the images of a plurality of frequency bands with a single simultaneous operation by utilizing a plurality of kinds of filters.

In the embodiment described above, the dynamic range of the residual image is compressed by using the function $f_1(g_L)$ shown in FIG. 5A. However, the image processing method in accordance with the present invention is not limited to the use of the function $f_1(g_L)$ shown in FIG. 5A, and any of other functions may be utilized.

Figure 5B:
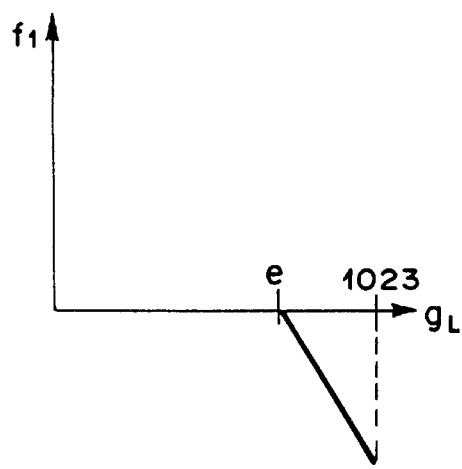

FIG. 5B is a graph showing a different example of the monotonically decreasing function, in which the value of the residual image signal $g_L$ serves as a variable. The function $f_1(g_L)$ shown in FIG. 5B has the characteristics such that the value of the function $f_1(g_L)$ is zero when the value of the residual image signal $g_L$ falls within the range of zero to e, and such that the function $f_1(g_L)$ takes values lying on the inclined straight line when the value of the residual image signal $g_L$ is larger than e.

Figure 5C:
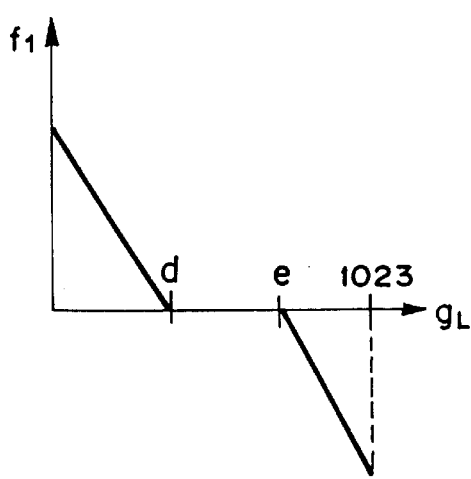

As another alternative, as illustrated in FIG. 5C, a function composed of the combination of the function shown in FIG. 5A and the function shown in FIG. 5B may be employed.

Figure 8A:
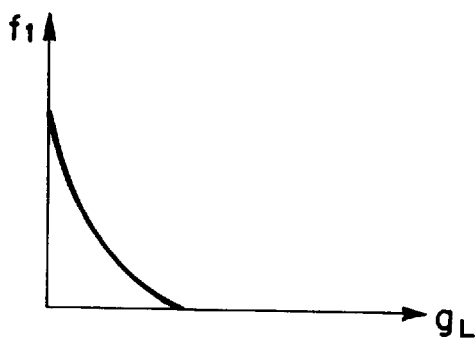
FIGS. 8A, 8B, and 8C are graphs showing different examples of the characteristics of functions f.
Figure 8B:
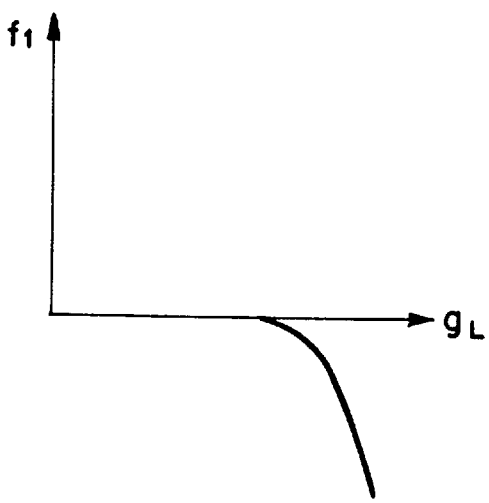
Figure 8C:
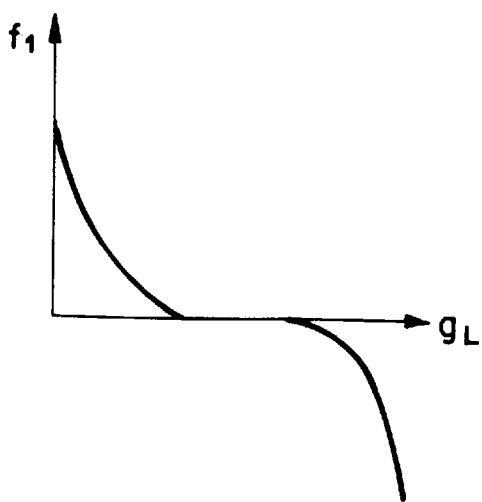

As a further alternative, one of functions illustrated in FIGS. 8A, 8B, and 8C may be employed as the function $f_1(g_L)$. The functions illustrated in FIGS. 8A, 8B, and 8C have the characteristics such that the line representing the function may not be folded sharply, and such that the differential coefficient of the function may be continuous. In cases where the functions shown in FIGS. 5A, 5B, and 5C are used, which have characteristics such that the line representing it folds sharply at the point, d or e, even if no particular contour is present in the original image, an artificial contour will occur at the part having the image density corresponding to the point, d or e, in the visible image reproduced from the processed image signal S'. In cases where the function $f_1(g_L)$ is employed which has characteristics such that the differential coefficient is continuous, no artificial contour occurs in the reproduced visible image.

In the aforesaid embodiment, the image signal representing the processed residual image $g_L'$ is obtained with Formula (1) shown above. Alternatively, the image signal representing the processed residual image $g_L'$ may be obtained with Formula (3) shown below.

$$g_L' = g_L + \alpha \cdot f_3(g_L) \tag{3}$$

wherein $f_3(g_L)$ represents the function, the value of which decreases monotonically as the value of the residual image signal $g_L$ increases, and α represents the degree of emphasis. In such cases, the extent of the dynamic range compressing process carried out on the residual image $g_L$ can be altered. Accordingly, the dynamic range compressing process can be carried out with a high degree of freedom.

What is claimed is:

1. An image processing method, comprising the steps of:
   i) transforming an original image into a multi-resolution space, the original image being thereby decomposed into images, each of which is of one of a plurality of different resolutions,
   ii) processing an image of the lowest resolution, which is lowest among all the different resolutions, with the formula $$g_L' = g_L + f_1(g_L) = f_2(g_L)$$

wherein $f_1(g_L)$ represents a function, the value of which decreases monotonically as the signal value $g_L$ of the image of the lowest resolution increases, a processed image of the lowest resolution being obtained from said processing which is smaller in size than the original image, and
   iii) carrying out an inverse multi-resolution transform of the processed image of the lowest resolution and the images of the other resolutions, a processed image being obtained from the inverse multi-resolution transform;
      wherein said transform of the original image into the multi-resolution space is carried out with a technique for transforming the original image into a multi-resolution space so that the size of the image being processed becomes smaller as the resolution becomes lower.

2. A method as defined in claim 1 wherein said transform of the original image into the multi-resolution space is carried out with a technique selected from the group consisting of a Laplacian pyramid technique, and a wavelet transform.

3. A method as defined in claim 1 wherein the original image is a radiation image.

4. An image processing method, comprising the steps of:
   i) transforming an original image into a multi-resolution space, the original image being thereby decomposed into images, each of which is of one of a plurality of different resolutions,
   ii) processing an image of the lowest resolution, which is lowest among all the different resolutions, with the formula $$g_L' = g_L + \alpha \cdot f_3(g_L)$$

wherein $f_3(g_L)$ represents a function, the value of which decreases monotonically as the signal value $g_L$ of the image of the lowest resolution increases, and α represents the degree of emphasis, a processed image of the lowest resolution being obtained from said processing which is smaller in size than the original image, and iii) carrying out an inverse multi-resolution transform of the processed image of the lowest resolution and the images of the other resolutions, a processed image being obtained from the inverse multi-resolution transform;

wherein said transform of the original image into the multi-resolution space is carried out with a technique for transforming the original image into a multi-resolution space so that the size of the image being processed becomes smaller as the resolution becomes lower.

5. A method as defined in claim 4 wherein said transform of the original image into the multi-resolution space is carried out with a technique selected from the group consisting of a Laplacian pyramid technique, and a wavelet transform.

6. A method as defined in claim 4 wherein the original image is a radiation image.

7. An image processing apparatus, comprising:

i) a multi-resolution decomposing means for transforming an original image into a multi-resolution space, the original image being thereby decomposed into images, each of which is of one of a plurality of different resolutions, ii) an operations means for processing an image of the lowest resolution, which is lowest among all the different resolutions, with the formula $$g_L' = g_L + f_1(g_L) = f_2(g_L)$$

wherein $f_1(g_L)$ represents a function, the value of which decreases monotonically as the signal value $g_L$ of the image of the lowest resolution increases, a processed image of the lowest resolution being obtained from said processing which is smaller in size than the original image, and iii) an inverse transform means for carrying out an inverse multi-resolution transform of the processed image of the lowest resolution and the images of the other resolutions, a processed image being obtained from the inverse multi-resolution transform;

wherein said transform of the original image into the multi-resolution space is carried out with a technique for transforming the original image into a multi-resolution space so that the size of the image being processed becomes smaller as the resolution becomes lower.

8. An apparatus as defined in claim 7 wherein said transform of the original image into the multi-resolution space is carried out with a technique selected from the group consisting of a Laplacian pyramid technique, and a wavelet transform.

9. An apparatus as defined in claim 7 wherein the original image is a radiation image.

10. An image processing apparatus, comprising:

i) a multi-resolution decomposing means for transforming an original image into a multi-resolution space, the original image being thereby decomposed into images, each of which is of one of a plurality of different resolutions, ii) an operations means for processing an image of the lowest resolution, which is lowest among all the different resolutions, with the formula $$g_L' = g_L + \alpha \cdot f_3(g_L)$$

wherein $f_3(g_L)$ represents a function, the value of which decreases monotonically as the signal value $g_L$ of the image of the lowest resolution increases, and α represents the degree of emphasis, a processed image of the lowest resolution being obtained from said processing which is smaller in size than the original image, and iii) an inverse transform means for carrying out an inverse multi-resolution transform of the processed image of the lowest resolution and the images of the other resolutions, a processed image being obtained from the inverse multi-resolution transform;

wherein said transform of the original image into the multi-resolution space is carried out with a technique for transforming the original image into a multi-resolution space so that the size of the image being processed becomes smaller as the resolution becomes lower.

11. An apparatus as defined in claim 10 wherein said transform of the original image into the multi-resolution space is carried out with a technique selected from the group consisting of a Laplacian pyramid technique, and a wavelet transform.

12. An apparatus as defined in claim 10 wherein the original image is a radiation image.

* * * * *